United States Patent
Ito et al.

(10) Patent No.: US 9,685,663 B2
(45) Date of Patent: Jun. 20, 2017

(54) BASE MATERIAL FOR GAS DIFFUSION ELECTRODE

(71) Applicant: Japan Vilene Company, Ltd., Tokyo (JP)

(72) Inventors: Tatsunori Ito, Koga (JP); Takashi Tarao, Koga (JP)

(73) Assignee: JAPAN VILENE COMPANY, LTD., Tokyo (JP)

( * ) Notice: Subject to any disclaimer, the term of this patent is extended or adjusted under 35 U.S.C. 154(b) by 0 days.

(21) Appl. No.: 14/891,025

(22) PCT Filed: May 15, 2014

(86) PCT No.: PCT/JP2014/062954
§ 371 (c)(1),
(2) Date: Nov. 13, 2015

(87) PCT Pub. No.: WO2014/185491
PCT Pub. Date: Nov. 20, 2014

(65) Prior Publication Data
US 2016/0118669 A1    Apr. 28, 2016

(30) Foreign Application Priority Data
May 15, 2013   (JP) ................... 2013-103561

(51) Int. Cl.
*H01M 4/86*    (2006.01)
*H01M 8/0234*   (2016.01)
(Continued)

(52) U.S. Cl.
CPC ....... *H01M 4/8626* (2013.01); *H01M 4/8605* (2013.01); *H01M 8/0234* (2013.01);
(Continued)

(58) Field of Classification Search
None
See application file for complete search history.

(56) References Cited

U.S. PATENT DOCUMENTS

| 6,416,896 B1 | 7/2002 | Tamaru et al. |
| 2008/0318116 A1 | 12/2008 | Kimura et al. |

(Continued)

FOREIGN PATENT DOCUMENTS

| JP | 11-204114 A | 7/1999 |
| JP | 2008-204945 A | 9/2008 |

(Continued)

OTHER PUBLICATIONS

Extended European Search Report for EP 14797557.7 mailed on Sep. 12, 2016.

(Continued)

*Primary Examiner* — Sarah A Slifka
(74) *Attorney, Agent, or Firm* — Heslin Rothenberg Farley & Mesiti P.C.

(57) ABSTRACT

The base material for a gas diffusion electrode of the present invention comprises a nonwoven fabric containing conductive fibers that contain conductive particles at least in the inside of an organic resin, and is characterized in that a specific apparent Young's modulus of the base material for a gas diffusion electrode is 40 [MPa/(g/cm$^3$)] or more. Since the base material contains conductive fibers that contain conductive particles at least in the inside of an organic resin, it is flexible, and as a result, a polymer electrolyte membrane is not directly damaged. Further, since the specific apparent Young's modulus is 40 [MPa/(g/cm$^3$)] or more, which indicates a high rigidity, and swelling and shrinkage of the polymer electrolyte membrane can be inhibited, cracking of the polymer electrolyte membrane can be avoided.

1 Claim, 1 Drawing Sheet (51) Int. Cl.
*H01M 8/0239* (2016.01)
*H01M 8/0243* (2016.01)
*H01M 8/1018* (2016.01)

(52) U.S. Cl.
CPC ....... *H01M 8/0239* (2013.01); *H01M 8/0243* (2013.01); *H01M 2008/1095* (2013.01)

(56) References Cited

U.S. PATENT DOCUMENTS

| | | |
|---|---|---|
| 2010/0323272 A1 | 12/2010 | Ozaki et al. |
| 2011/0147673 A1 | 6/2011 | Gaillard et al. |
| 2013/0040213 A1 | 2/2013 | Ito et al. |

FOREIGN PATENT DOCUMENTS

| | | |
|---|---|---|
| JP | 2011028849 A | 2/2011 |
| JP | 2012-199225 A | 10/2012 |
| JP | 2013-101771 A | 5/2013 |
| JP | 2014-22119 A | 2/2014 |
| JP | 2014-32878 A | 2/2014 |
| WO | 2014/010715 A1 | 1/2014 |
| WO | 2015146984 A1 | 10/2015 |

OTHER PUBLICATIONS

English Translation of the Written Opinion of the International Searching Authority for PCT/JP2014/062954 mailed on Jun. 10, 2014.
"Technology Trends Survey on Fuel Cell" Technology Research Division, JPO Ed., May 31, 2011, available at: http://www.jpo.go.jp/shiryou/index.htm.
International Search Report for International Application No. PCT/JP2014/062954, dated Jun. 10, 2014.

BASE MATERIAL FOR GAS DIFFUSION ELECTRODE

CROSS REFERENCE TO RELATED APPLICATIONS

This application is a national stage filing under section 371 of International Application No. PCT/JP2014/062954, filed on May 15, 2014, and published in Japanese on Nov. 20, 2014 as WO 2014/185491, and claims priority to Japanese Application No. 2013-103561, filed on May 15, 2013. The entire disclosures of each of the prior applications are hereby incorporated herein by reference.

TECHNICAL FIELD

The present invention relates to a base material for a gas diffusion electrode.

BACKGROUND ART

With respect to the energy which is used in various forms, due to concerns over depletion of petroleum resources, the search for alternative fuels and resource saving have become important issues. Under these circumstances, for fuel cells that convert various fuels to chemical energy, which is taken as electric power, active development continues.

Fuel cells are divided into the four categories of phosphoric acid fuel cells (PAFC), molten carbonate fuel cells (MCFC), solid oxide fuel cells (SOFC), and polymer electrolyte fuel cells (PEFC), in accordance with the type of electrolyte used, as disclosed, for example, on page 5 of "Technology trends survey on fuel cell" (hereinafter referred to as Non-patent literature 1). These various fuel cells are restricted in their operating temperature ranges depending on the electrolyte used, and are known to operate in a low temperature range of 100° C. or lower for PEFC, in a middle temperature range of 180 to 210° C. for PAFC, in a range of 600° C. or higher for MCFC, and in a high temperature range of around 1000° C. for SOFC. Among these fuel cells, in general PEFCs capable of output in a low temperature range, electric power generated along with a chemical reaction of a hydrogen gas as a fuel with an oxygen gas (or air) is taken out. Since electric power can be efficiently taken out by a relatively small device configuration, practical applications, such as home applications or automotive applications, have been advanced.

Figure 1:
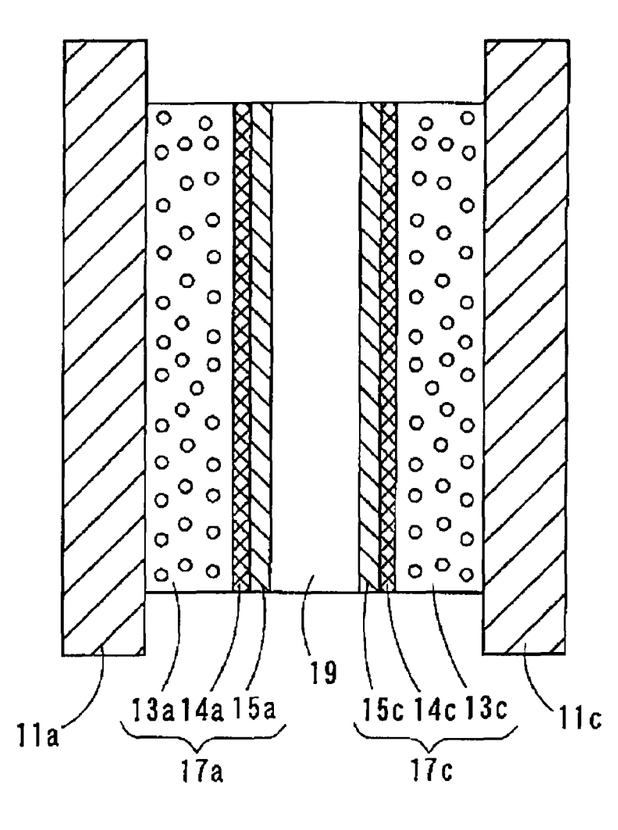
FIG. 1 is a schematic sectional view which schematically shows the structure of a polymer electrolyte fuel cell.

FIG. 1 is a schematic cross-sectional view of the main part of a fuel cell, showing a basic configuration of a conventionally known PEFC. In the FIGURE, the same hatching is used to indicate constitutional components having the substantially same structure or function as materials. As shown in FIG. 1, the PEFC has a multi-layered structure of cell units, in which a membrane-electrode assembly (MEA) containing a fuel electrode (gas diffusion electrode) 17a, polymer electrolyte membrane 19, and an air electrode (gas diffusion electrode) 17c is sandwiched between a pair of bipolar plates 11a, 11c. The fuel electrode 17a contains a catalyst layer 15a, which decomposes a fuel gas into protons and electrons, and a gas diffusion layer 13a, which supplies the fuel gas to the catalyst layer 15a, and a water control layer 14a is arranged between the catalyst layer 15a and the gas diffusion layer 13a. On the other hand, the air electrode 17c contains a catalyst layer 15c, in which protons, electrons, and an oxygen-containing gas are reacted, and a gas diffusion layer 13c, which supplies the oxygen-containing gas to the catalyst layer 15c, and a water control layer 14c is arranged between the catalyst layer 15c and the gas diffusion layer 13c.

Since the bipolar plate 11a has grooves capable of supplying the fuel gas, when the fuel gas is supplied through the grooves of the bipolar plate 11a, the fuel gas diffuses into the gas diffusion layer 13a, passes through the water control layer 14a, and is supplied to the catalyst layer 15a. The fuel gas supplied is decomposed into protons and electrons, and the protons pass through the polymer electrolyte membrane 19, and reach the catalyst layer 15c. On the other hand, the electrons pass through an external circuit (not shown), and moves to the air electrode 17c. Since the bipolar plate 11c has grooves capable of supplying the oxygen-containing gas, when the oxygen-containing gas is supplied through the grooves of the bipolar plate 11c, the oxygen-containing gas diffuses into the gas diffusion layer 13c, passes through the water control layer 14c, and is supplied to the catalyst layer 15c. The oxygen-containing gas supplied reacts with the protons, which have passed through the polymer electrolyte membrane 19, and the electrons, which have passed through the external circuit, to generate water. The generated water passes through the water control layer 14c, and is discharged to the outside of the fuel cell. On the other hand, in the fuel electrode, water reversely-diffused from the air electrode passes through the water control layer 14a, and is discharged to the outside of the fuel cell.

Functions required in the gas diffusion layer 13a and the water control layer 14a, or the gas diffusion layer 13c and the water control layer 14c include moisture retaining properties, in order to keep the polymer electrolyte membrane 19 wet under low humidity conditions, drainability, in order to avoid flooding caused by water accumulated in the fuel cell under high humidity conditions, and the like. Conventionally, with respect to the gas diffusion layer 13a and the water control layer 14a, or the gas diffusion layer 13c and the water control layer 14c, a conductive porous substrate such as carbon paper was immersed in a fluorine-based resin such as polytetrafluoroethylene, or was applied with a paste prepared by mixing carbon powder with a fluorine-based resin, to form the water control layers 14a, 14c, in which the fluorine-based resin was present, or in which the carbon powder and the fluorine-based resin were present, and to regard the portions where they were not present as the gas diffusion layers 13a, 13c. However, in the water control layers 14a, 14c formed as described above, although the conductive porous substrate was applied with the fluorine-based resin, or the carbon powder and the fluorine-based resin, the carbon paper or the like was used as the conductive porous substrate, and carbon fibers constituting the carbon paper had a high rigidity, and therefore, the carbon fibers sometimes penetrated the water control layers 14a, 14c and the catalyst layers 15a, 15c, and a short circuit sometimes occurred due to the damage of the polymer electrolyte membrane.

The applicant of the present application proposed "a gas diffusion electrode obtained by: preparing a base material for a gas diffusion electrode composed of a glass nonwoven fabric, in which a binder containing an acrylic resin and/or a vinyl acetate resin is adhered to glass fibers; and coating the base material for a gas diffusion electrode with a conductive paste containing carbon black and a polytetrafluoroethylene resin or a polyvinylidene fluoride resin, and sintering it" (Patent literature 1). However, since the glass fibers had a high rigidity, as similar to the conventional carbon paper, the glass fibers sometimes penetrated the water control layers 14a, 14c and the catalyst layers 15a, 15c, and a short circuit sometimes occurred due to the damage of the polymer electrolyte membrane.

Therefore, the present applicant further proposed "a base material for a gas diffusion electrode, comprising a nonwoven fabric containing conductive fibers containing conductive particles at least in the inside of an organic resin" (Patent literature 2). Since this base material for a gas diffusion electrode was based on an organic resin, it was flexible, and as a result, there was no case where the conductive fibers directly damaged the polymer electrolyte membrane, and a short circuit occurred. However, since a gas diffusion electrode using the base material for a gas diffusion electrode was flexible, an effect of inhibiting swelling and shrinkage of the polymer electrolyte membrane was insufficient. That is to say, the polymer electrolyte membrane repeats swelling and shrinkage depending on the humidity state during the power generation of the fuel cell. The swelling and shrinkage generated a stress between the polymer electrolyte membrane and the gas diffusion electrodes, caused by the difference between the amount of swelling and the amount of shrinkage, and as a result, distortion sometimes occurred, and eventually cracking sometimes occurred.

CITATION LIST

Patent Literature

[Patent literature 1] JP 2008-204945 A
[Patent literature 2] WO 2014/010715 (Priority data: Japanese Patent Application No. 2012-158122)

Non-Patent Literature

[Non-patent literature 1] "Technology trends survey on fuel cell" (Technology Research Division, JPO Ed., May 31, 2001, <URL> http://www.jpo.go.jp/shiryou/index.htm)

SUMMARY OF INVENTION

Technical Problem

The present invention has been completed under these circumstances, and an object of the present invention is to provide a base material for a gas diffusion electrode capable of preparing a gas diffusion electrode in which a polymer electrolyte membrane is not directly damaged, and swelling and shrinkage of the polymer electrolyte membrane can be inhibited.

Solution to Problem

The present invention relates to "a base material for a gas diffusion electrode, comprising a nonwoven fabric containing conductive fibers that contain conductive particles at least in the inside of an organic resin, characterized in that a specific apparent Young's modulus of the base material for a gas diffusion electrode is 40 [MPa/(g/cm$^3$)] or more".

Advantageous Effects of Invention

According to the base material for a gas diffusion electrode of the present invention, since the nonwoven fabric, which constitutes the base material for a gas diffusion electrode, contains conductive fibers that contain conductive particles at least in the inside of an organic resin, it is flexible, and a polymer electrolyte membrane is not directly damaged, as in the case of using a base material for a gas diffusion electrode made of carbon fibers or glass fibers. Further, since the specific apparent Young's modulus of the base material for a gas diffusion electrode is 40 [MPa/(g/cm$^3$)] or more, which indicates a higher rigidity than that of a conventional base material for a gas diffusion electrode containing conductive fibers containing conductive particles at least in the inside of an organic resin, and swelling and shrinkage of the polymer electrolyte membrane can be inhibited, cracking of the polymer electrolyte membrane caused by the swelling and shrinkage can be avoided.

DESCRIPTION OF EMBODIMENTS

The base material for a gas diffusion electrode of the present invention (hereinafter sometimes and simply referred to as "electrode substrate") contains a nonwoven fabric containing conductive fibers that contain conductive particles at least in the inside of an organic resin. Since the conductive fibers in the nonwoven fabric are flexible because of containing the organic resin, a polymer electrolyte membrane is not directly damaged by the conductive fibers, and a short circuit does not occur. In connection with this, the "organic resin" as used herein does not include diamond, graphite, and amorphous carbon.

The organic resin, which constitutes the conductive fibers, is not particularly limited, and may be a hydrophobic organic resin or a hydrophilic organic resin, or a mixture or composite thereof. When the conductive fibers contain the hydrophobic organic resin, the nonwoven fabric exhibits a good water permeability without being impregnated with a hydrophobic resin, such as a fluorine-based resin, and exhibits a good drainability. On the other hand, when the conductive fibers contain the hydrophilic organic resin, since moisture can be retained, it is possible to keep a polymer electrolyte membrane in a wet state even under low humidity, and it is possible to prepare a polymer electrolyte fuel cell capable of demonstrating a good power generation performance even under low humidity.

The "hydrophobic organic resin" is an organic resin having a contact angle with water of 90° or more. Examples of the hydrophobic organic resin include fluorine-based resins, such as polytetrafluoroethylene (PTFE), polychlorotrifluoroethylene (PCTFE), polyvinylidene fluoride (PVDF), polyvinyl fluoride (PVF), a perfluoroalkoxy fluorocarbon resin (PFA), a tetrafluoroethylene-hexafluoropropylene copolymer (FEP), an ethylene-tetrafluoroethylene copolymer (ETFE), an ethylene-chlorotrifluoroethylene copolymer (ECTFE), a vinylidene fluoride-tetrafluoroethylene-hexafluoropropylene copolymer, and a copolymer of various monomers constituting these resins; polyolefin-based resins, such as polyethylene (PE) and polypropylene (PP); and polyester-based resins, such as polyethylene terephthalate (PET) and polyethylene naphthalate (PEN). These hydrophobic resins may be used alone, or as a mixture or composite of two or more resins. Among these resins, the fluorine-based resins are preferably used, because of a high heat resistance, a high chemical resistance, and a high hydrophobicity.

On the other hand, the "hydrophilic organic resin" is an organic resin having a contact angle with water of less than 90°. Examples of the hydrophilic organic resin include resins having one or more hydrophilic groups (an amide group, a carboxyl group, a hydroxyl group, an amino group, a sulfonic acid group, and the like), for example, cellulose, such as rayon; acrylic resins, such as polyacrylonitrile, oxidized acrylic, polyacrylic acid, and polymethacrylic acid; polyamide resins, such as nylon 6 and nylon 66; polyvinyl alcohol resins; hydrophilic polyurethane; polyvinyl pyrrolidone; and thermosetting resins, such as phenolic resins, urea resins, melamine resins, unsaturated polyester resins, and epoxy resins. These hydrophilic organic resins may be used alone, or as a mixture or composite of two or more resins.

In connection with this, it is preferable to contain the thermosetting resins so as to inhibit swelling and shrinkage of a polymer electrolyte membrane, and avoid cracking of the polymer electrolyte membrane, by a high rigidity of the conductive fibers, and as a result, by a high rigidity of the electrode substrate. Among the thermosetting resins, phenolic resins or epoxy resins are preferable, because they exhibit heat resistance and acid resistance, and the rigidity of the electrode substrate can be improved by heat treatment.

The conductive fibers in the present invention contain conductive particles at least in the inside of the organic resin so that, when the electrode substrate is used as a gas diffusion electrode, it exhibits a good electron mobility. That is to say, in the state where the conductive particles are present only on the outer surface of the organic resin, the organic resin component acts as a resistance component, and the electrode substrate exhibits a poor conductivity in the thickness direction of the gas diffusion electrode. On the other hand, since the present invention contains the conductive particles in the inside of the organic resin, it exhibits a good conductivity even in the thickness direction of the gas diffusion electrode. From the viewpoint of conductivity, it is preferable that the conductive particles are exposed from the organic resin. The wording "contain conductive particles in the inside" means not only the state where the conductive particles are completely embedded in the organic resin, but also the state where part of the conductive particles are exposed from the organic resin. Such conductive fibers containing conductive particles at least in the inside of the organic resin can be prepared, for example, by spinning a spinning solution containing the organic resin and the conductive particles.

The conductive particles are not particularly limited, but may be carbon black, carbon nanotubes, carbon nanofibers, metal particles, metal oxide particles, or the like. Among these, carbon black is preferable in view of chemical resistance, conductivity, and dispersibility. The particle diameter of this preferred carbon black is not particularly limited, but may be preferably 5 nm to 200 nm, and more preferably 10 nm to 100 nm, as an average primary particle diameter. In connection with this, the average primary particle diameter of the conductive particles is preferably smaller than the fiber diameter of the conductive fibers described below so that the conductive particles are unlikely to fall off, and it is easy to form a fiber form. Carbon nanofibers, such as vapor grown carbon fibers, are preferable, because it is easy to increase the specific apparent Young's modulus of the electrode substrate because of being a fiber form.

The mass ratio of the conductive particles and the organic resin (conductive particles:organic resin) is not particularly limited, but is preferably 10-90:90-10, more preferably 20-80:80-20, still more preferably 30-70:70-30, still more preferably 35-65:65-35, and still more preferably 40-60:60-40. When the amount of the conductive particles is less than 10 mass %, the conductivity tends to be insufficient. On the other hand, when the amount of the conductive particles is more than 90 mass %, there is a tendency that the fiber formation is lowered.

The conductive particles account for preferably 10-90 mass %, more preferably 20-80 mass %, still more preferably 30-70 mass %, still more preferably 35-65 mass %, and still more preferably 40-60 mass % of the nonwoven fabric (electrode substrate), so that the electrode substrate exhibits a good conductivity.

The average fiber diameter of the conductive fibers in the present invention is not particularly limited, but is preferably 10 nm to 10 μm, more preferably 50 nm to 5 μm, and still more preferably 50 nm to 1 μm. When the average fiber diameter is more than 10 μm, contact points of the fibers in the electrode substrate are small in number, and as a result, the conductivity tends to be insufficient. On the other hand, when the average fiber diameter is less than 10 nm, there is a tendency that it is difficult to contain the conductive particles in the inside of the fibers. In connection with this, the average fiber diameter of the conductive fibers is preferably five times or more of the primary particle diameter of the conductive particles so that the conductive particles are unlikely to fall off. The conductive fibers having such an average fiber diameter can be prepared, for example, by an electrospinning method, a spunbond method, a meltblown method, or a method as disclosed in JP 2009-287138 A, which is a method of fiberizing a spinning solution by ejecting a gas in parallel to the spinning solution extruded from exits for extruding liquid, and exerting a shearing force on the spinning solution single-linearly.

The "average fiber diameter" as used herein means an arithmetic mean value of fiber diameters measured at 40 points of fibers, and the "fiber diameter" means a length measured on the basis of micrographs. When the nonwoven fabric is composed of only conductive fibers from which the conductive particles are exposed, the "fiber diameter" means a diameter including the exposed conductive particles. When the nonwoven fabric does not contain conductive fibers from which the conductive particles are exposed, or when the nonwoven fabric contains both conductive fibers from which the conductive particles are exposed and conductive fibers having a portion from which the conductive particles are not exposed, the "fiber diameter" means a diameter of the portion from which the conductive particles are not exposed.

The conductive fibers in the present invention are preferably continuous fibers so that electron mobility is good, and so that the end portions of the conductive fibers are small in number, and as a result, the damage in a polymer electrolyte membrane can be avoided. Such conductive continuous fibers can be prepared, for example, by an electrospinning method or a spunbond method.

The mass content of the conductive fibers in the nonwoven fabric, which constitutes the electrode substrate of the present invention, is preferably 10% or more, more preferably 50% or more, still more preferably 70% or more, still more preferably 90% or more, and most preferably composed of only the conductive fibers, so as to exhibit a good electron mobility. As fibers other than the conductive fibers, hydrophobic organic fibers, such as fluorine fibers or polyolefin fibers, or hydrophilic organic fibers, such as acrylic fibers, nylon fibers (for example, nylon 6, nylon 66, and the like), or phenol fibers, can be contained.

Although the nonwoven fabric, which constitutes the electrode substrate of the present invention, can contain fibers other than the conductive fibers, the electrical resistance is preferably 150 mΩ·cm$^2$ or less, more preferably 100 mΩ·cm² or less, and still more preferably 50 mΩ·cm² or less so as to exhibit a good electron mobility. With respect to the "electrical resistance" in the present invention, an electrode substrate, which is cut into 5 cm square (25 cm²), is sandwiched from the both sides using carbon plates, and the voltage (V) is measured under a pressure of 2 MPa in the stacking direction of the carbon plates, while applying a current (I) of 1 A. Next, the resistance (R=V/I) is calculated, and the "electrical resistance" is a value obtained by multiplying the resistance by the area (25 cm²) of the electrode substrate.

The nonwoven fabric, which constitutes the electrode substrate of the present invention, may be bound using an adhesive so as to maintain its form, but it is preferable to maintain the form by the binding of the organic resin constituting the conductive fibers so that the electrode substrate exhibits a good conductivity. Examples of the binding of the organic resin, as a preferred embodiment, include the entanglement of the fibers, the binding by plasticization due to a solvent, or the binding by fusion due to heat.

The mass per unit area of the nonwoven fabric, which constitutes the electrode substrate of the present invention, is not particularly limited, but it is preferably 0.5 to 200 g/m², more preferably 0.5 to 100 g/m², and still more preferably 0.5 to 50 g/m² from the viewpoint of drainability, gas diffusivity, handling properties, and productivity. The thickness is not particularly limited, but it is preferably 1 to 1000 μm, more preferably 1 to 500 μm, still more preferably 30 to 300 μm, and still more preferably 50 to 250 μm.

The "mass per unit area" in the present invention is a value obtained by measuring the mass of a sample, which is cut into 10 cm square, and converting the measuring value to the mass of the size of 1 m². The "thickness" is a value measured using a thickness gauge (manufactured by Mitutoyo Corporation, Code No. 547-401, measuring force: 3.5 N or less).

The electrode substrate of the present invention contains the nonwoven fabric containing the conductive fibers, as described above. When the specific apparent Young's modulus is 40 [MPa/(g/cm³)] or more, the rigidity becomes higher than that of a conventional electrode substrate, which contains conductive fibers containing conductive particles at least in the inside of an organic resin, and swelling and shrinkage of a polymer electrolyte membrane can be inhibited, and therefore, cracking of the polymer electrolyte membrane caused by the swelling and shrinkage can be avoided.

As will be understood from the measuring method described below, the specific apparent Young's modulus is a value obtained by dividing the apparent Young's modulus, which is an index of the rigidity of an electrode substrate, by the apparent density of the electrode substrate. In the cases where the apparent density is high and low, even when the apparent Young's modulus is the same, the case of the low apparent density means that the rigidity of each conductive fiber is high, because, despite the small amount of the conductive fibers in the low apparent density case, the apparent Young's modulus is the same. As a result, the high rigidity of each conductive fiber means a good effect of inhibiting the swelling and shrinkage of the polymer electrolyte membrane, and therefore, the present invention is represented by the specific apparent Young's modulus, which is the value obtained by dividing the apparent Young's modulus of the electrode substrate by its apparent density. Since the higher the specific apparent Young's modulus is, the higher the rigidity of each conductive fiber is, and the better the inhibiting effect of the swelling and shrinkage of the polymer electrolyte membrane is, the specific apparent Young's modulus is preferably 45 [MPa/(g/cm³)] or more, more preferably 50 [MPa/(g/cm³)] or more, still more preferably 60 [MPa/(g/cm³)] or more, still more preferably 70 [MPa/(g/cm³)] or more, still more preferably 80 [MPa/(g/cm³)] or more, and still more preferably 90 [MPa/(g/cm³)] or more. On the other hand, since the polymer electrolyte membrane is sometimes directly damaged by the rigidity of the conductive fibers, when the specific apparent Young's modulus is too high, the specific apparent Young's modulus is preferably 1000 [MPa/(g/cm³)] or less, more preferably 900 [MPa/(g/cm³)] or less, still more preferably 700 [MPa/(g/cm³)] or less, and still more preferably 500 [MPa/(g/cm³)] or less. For reference, the specific apparent Young's modulus of an electrode substrate made of a carbon paper or a glass nonwoven fabric greatly exceeds 1000 [MPa/(g/cm³)].

The "specific apparent Young's modulus" in the present invention is a value obtained in accordance with the following procedure:

(1) The apparent density (g/cm³) is calculated by dividing the mass per unit area (g/cm²) of an electrode substrate to be evaluated, by the thickness (cm).

(2) Ten sheets of longitudinal test pieces, which are cut into a rectangle (50 mm in the longitudinal direction, and 5 mm in the transverse direction), and 10 sheets of transverse test pieces, which are cut into a rectangle (50 mm in the transverse direction, and 5 mm in the longitudinal direction), are prepared from the electrode substrate.

(3) Each test piece is used to carry out a tensile shear test, using a mini tensile tester (manufactured by search Co., Ltd., TSM-op01), under the conditions of a distance between chucks of 20 mm, and a tensile speed of 20 mm/min., to draw a load-elongation curve for each test piece.

(4) The tensile stress (MPa) is calculated by dividing the load (N) at the maximum point (the maximum point of the tangent angle) of the load change with respect to the elongation change near the origin point in the load-elongation curve for each, by the cross-sectional area [thickness (T)×5](unit: mm²) of the test piece before the tensile shear test. Next, the apparent Young's modulus is respectively calculated by dividing the tensile stress by the strain at the maximum point (dimensionless)[(elongation length of test piece (mm))/(original length of test piece (mm))]. The arithmetic mean value of the apparent Young's modulus for the 20 test pieces is calculated, and regarded as an "average apparent Young's modulus".

(5) The "specific apparent Young's modulus" is calculated by dividing the average apparent Young's modulus by the apparent density.

The specific rupture strength (MPa) of the electrode substrate of the present invention is preferably 0.5 MPa or more, more preferably 2 MPa or more, still more preferably 4 MPa or more, still more preferably 5 MPa or more, still more preferably 6 MPa or more, and still more preferably 7 MPa or more, so that the handling properties during the production of gas diffusion electrodes are good without the limitations of the thickness and the production cost. As will be understood from the measuring method described below, the specific rupture strength is a value obtained by dividing the rupture strength, which represents the strength of an electrode substrate, by the apparent density of the electrode substrate. In the cases where the apparent density is high and low, even when the tensile strength is the same, the case of the low apparent density means that the tensile strength of each conductive fiber is high, or that the binding among the conductive fibers is strong, because, despite the small amount of the conductive fibers in the low apparent density case, the tensile strength is the same. As a result, it means the amount of fibers (mass per unit area) required for ensuring the tensile strength required in production can be adjusted.

The "specific rupture strength" as used herein is a value obtained in accordance with the following procedure:

(1) The apparent density (g/cm$^3$) is calculated by dividing the mass per unit area (g/cm$^2$) of an electrode substrate to be evaluated, by the thickness (cm).
(2) Ten sheets of longitudinal test pieces, which are cut into a rectangle (50 mm in the longitudinal direction, and 5 mm in the transverse direction), and 10 sheets of transverse test pieces, which are cut into a rectangle (50 mm in the transverse direction, and 5 mm in the longitudinal direction), are prepared from the electrode substrate.
(3) Each test piece is used to carry out a tensile shear test, using a mini tensile tester (manufactured by search Co., Ltd., TSM-op01), under the conditions of a distance between chucks of 20 mm, and a tensile speed of 20 mm/min., to measure the rupture strength (N) for each test piece.
(4) Each tensile strength (MPa) is calculated by dividing the rupture strength (N) by the cross-sectional area [thickness (T)×5](unit: mm$^2$) of the test piece before the tensile shear test, and the arithmetic mean value of the tensile strength for the 20 test pieces is calculated, and regarded as an "average tensile strength".
(5) The "specific rupture strength" is calculated by dividing the average tensile strength by the apparent density.

The electrode substrate of the present invention contains the nonwoven fabric, as described above. Since the nonwoven fabric is porous, when nothing is filled in the voids of the nonwoven fabric, the nonwoven fabric exhibits a good drainability and a good gas diffusivity even in the plane direction, and therefore, a fuel cell having a high power generation performance can be produced. The porosity is preferably 20% or more, more preferably 30% or more, still more preferably 50% or more, still more preferably 60% or more, still more preferably 70% or more, and still more preferably 80% or more. The upper limit of the porosity is not particularly limited, but it is preferably 99% or less, more preferably 95% or less, and still more preferably 90% or less, from the viewpoint of shape stability. The porosity P (unit: %) means a value calculated from the following equation:

$$P=100-(Fr1+Fr2+\ldots+Frn)$$

wherein Frn is the filling rate (unit: %) of component n, which constitutes the nonwoven fabric, and a value calculated from the following equation:

$$Frn=M\times Prn/(T\times SGn)\times 100$$

wherein M is the mass per unit area (unit: g/cm$^2$) of the nonwoven fabric, T is the thickness (cm) of the nonwoven fabric, Prn is the presence mass ratio of component n (for example, an organic resin or conductive particles) in the nonwoven fabric, and SGn is the specific gravity (unit: g/cm$^3$) of component n.

In the electrode substrate of the present invention, it is preferable that nothing is filled in the voids of the nonwoven fabric so that the nonwoven fabric exhibits a good drainability and a good gas diffusivity even in the plane direction, and a fuel cell having a high power generation performance can be produced. However, a fluorine-based resin and/or carbon may be contained on the surface and/or in the voids of the nonwoven fabric, so long as the drainability and the gas diffusivity in the plane direction are not impaired.

Examples of the fluorine-based resin include polytetrafluoroethylene (PTFE), polychlorotrifluoroethylene (PCTFE), polyvinylidene fluoride (PVDF), polyvinyl fluoride (PVF), a perfluoroalkoxy fluorocarbon resin (PFA), a tetrafluoroethylene-hexafluoropropylene copolymer (FEP), an ethylene-tetrafluoroethylene copolymer (ETFE), an ethylene-chlorotrifluoroethylene copolymer (ECTFE), a vinylidene fluoride-tetrafluoroethylene-hexafluoropropylene copolymer, and a copolymer of various monomers constituting these resins. Examples of the carbon include carbon black, carbon nanotubes, and carbon nanofibers.

The electrode substrate of the present invention may be produced, for example, as follows.

A spinning solution prepared by mixing an organic resin and conductive particles is spun to form conductive fibers, and the conductive fibers are directly collected and accumulated to form a fiber web. It is preferable that a thermosetting resin (in particular, a phenolic resin or an epoxy resin) is contained as the organic resin, so that the conductive fibers have a rigidity higher than that of conventional conductive fibers containing conductive particles at least in the inside of the organic resin.

When the fiber web per se has a sufficient strength, the fiber web may be used as the nonwoven fabric (electrode substrate). Alternatively, in order to impart or improve the strength, the fiber web may be bound, for example, by plasticization using a solvent, by fusion due to heat, by binding using an adhesive, or the like, to form the nonwoven fabric (electrode substrate). In particular, in the case where a preferred thermosetting resin is contained, it is preferable to increase the rigidity of the conductive fibers by curing the resin by heat. In connection with this, the conditions to cure thermosetting resins vary in accordance with the type of the thermosetting resins, the conditions may be appropriately selected in accordance with the type of the thermosetting resin.

It is preferable that the fibers which constitute the fiber web formed by directly collecting and accumulating the conductive fibers are continuous long fibers. Due to being the continuous long fibers, not only the conductivity and the strength are superior, but also the end portions of the fibers are small in number, and as a result, the damage in the polymer electrolyte membrane can be avoided.

As the method of forming the fiber web, for example, an electrospinning method, a spunbond method, a meltblown method, or a method as disclosed in JP 2009-287138 A, which is a method of fiberizing a spinning solution by ejecting a gas in parallel to the spinning solution extruded from exits for extruding liquid, and exerting a shearing force on the spinning solution single-linearly. Among these methods, the electrospinning or the method disclosed in JP 2009-287138 A is preferable, because conductive fibers having a small fiber diameter can be spun, a thin nonwoven fabric can be prepared, and as a result, the resistance of a fuel cell can be lowered, and the volume of the fuel cell can be reduced. In particular, the electrospinning is preferable, because continuous conductive fibers can be formed by electrospinning, and therefore, the end portions of the fibers are small in number, and as a result, the damage in the polymer electrolyte membrane can be avoided.

Like the electrospinning or the method disclosed in JP 2009-287138 A, in the case where the conductive particles are mixed with a solution prepared by dissolving the organic resin in a solvent, when a solvent which is difficult to volatilize during spinning is used as the solvent, and after the formation of a fiber web or a nonwoven fabric, the spinning solvent is removed by solvent substitution. In this case, the conductive fibers tend to become in the state bonded by plasticized, and as a result, a nonwoven fabric having a high conductivity can be produced, and further, since the electrode substrate becomes dense, the contact resistance in the fuel cell is likely to become low. This embodiment is preferable.

In connection with this, the conductive fibers may be wound up as continuous fibers, and cut into a desired fiber length to obtain short fibers, and a fiber web may be formed by a known dry method or wet method, and bound by plasticization using a solvent, by fusion due to heat, by binding using an adhesive, or the like, to form the nonwoven fabric. However, as described above, since it is preferable that the conductive fibers, which constitute the nonwoven fabric, are continuous fibers, it is preferable that the nonwoven fabric is derived from the fiber web formed by directly collecting and accumulating the continuous conductive fibers.

In the case where the organic resin, which constitutes the conductive fibers, is oxidized acrylic, a spinning solution prepared by mixing an acrylic resin and conductive particles may be spun to form conductive fibers, and a fiber web containing the conductive fibers may be directly or indirectly formed, and heated at a temperature of 200 to 300° C. in the air, to further improve the conductivity of the nonwoven fabric by converting the acrylic resin into oxidized acrylic. Alternatively, a spinning solution prepared by mixing an acrylic resin and conductive particles may be spun to form conductive fibers, and the conductive fibers may be heated at a temperature of 200 to 300° C. in the air to convert the acrylic resin into oxidized acrylic, and the conductive fibers consisting of oxidized acrylic and the conductive particles may be used to form the nonwoven fabric.

In the case where the organic resin, which constitutes the conductive fibers, contains a heat-resistant organic resin having a melting point higher than 350° C., the nonwoven fabric may be immersed in a fluorine-based dispersion, such as a polytetrafluoroethylene dispersion, to impart the fluorine-based resin to the nonwoven fabric, and may be heated at a temperature of 300 to 350° C. to form an electrode substrate having an increased water repellency.

The electrode substrate of the present invention may be used to prepare a gas diffusion electrode wherein a catalyst is carried on the electrode substrate. Since the electrode substrate of the present invention is used in the gas diffusion electrode, the polymer electrolyte membrane is not directly damaged, and swelling and shrinkage of the polymer electrolyte membrane can be inhibited.

Since the catalyst is carried on the surface of the conductive fibers in the gas diffusion electrode, and not only the electronic conduction due to contact of the catalyst with each other, but also an electron conduction path by the conductive fibers is formed, the catalyst which is isolated from the electron conduction path is small in number. Further, since the electrode substrate is a porous body having a nonwoven-fabric-structure, and exhibits a good drainability and a good gas diffusivity, a gas can be sufficiently and stably supplied to the three-phase interface (the reaction field in which the gas, the catalyst, and the electrolyte resin are associated). Because of these reasons, the electrode substrate of the present invention shows the effects that a catalyst can be efficiently used, and the amount of the catalyst can be reduced.

The gas diffusion electrode has completely the same structure as that of a conventional gas diffusion electrode, except that it contains the electrode substrate of the present invention. Examples of the catalyst include platinum, a platinum alloy, palladium, a palladium alloy, titanium, manganese, magnesium, lanthanum, vanadium, zirconium, iridium, rhodium, ruthenium, gold, a nickel-lanthanum alloy, a titanium-iron alloy, and the like. One or more selected from these catalysts may be carried.

It is preferable that not only the catalyst but also an electron conductor and a proton conductor are contained. The electron conductor is preferably a conductive particle, which is the same as that contained in the conductive fibers, such as carbon black. The catalyst may be carried on the conductive particles. The proton conductor is preferably an ion-exchange resin.

Such a gas diffusion electrode can be prepared, for example, as follows.

First, a catalyst (for example, carbon powder carrying a catalyst, such as platinum) is added to and mixed with a single or mixed solvent consisting of ethanol, propanol, butanol, ethylene glycol dimethyl ether, and the like, and an ion-exchange resin solution is further added thereto, and the mixture is uniformly mixed by ultrasonic dispersion or the like to obtain a catalyst-dispersed suspension. Next, the electrode substrate of the present invention is coated or sprayed with the catalyst-dispersed suspension, and dried to produce the gas diffusion electrode.

The electrode substrate of the present invention may be used to prepare a membrane-electrode assembly. Since the electrode substrate of the present invention is used in the membrane-electrode assembly, the polymer electrolyte membrane is not directly damaged, and swelling and shrinkage of the polymer electrolyte membrane can be inhibited. The membrane-electrode assembly is completely the same as a conventional membrane-electrode assembly, except that it contains the electrode substrate of the present invention. Such a membrane-electrode assembly can be produced, for example, by sandwiching the polymer electrolyte membrane between the catalyst-carrying surfaces of a pair of the gas diffusion electrodes, which are prepared using the electrode substrate of the present invention, and binding them by hot pressing. Alternatively, the membrane-electrode assembly can be produced by applying a support with the catalyst-dispersed suspension, as described above, to form a catalyst layer, transferring the catalyst layer onto the polymer electrolyte membrane, laminating the electrode substrate of the present invention on the catalyst layer, and hot-pressing them.

As the polymer electrolyte membrane, for example, a perfluorocarbon sulfonic acid-based resin membrane, a sulfonated aromatic hydrocarbon-based resin membrane, an alkyl sulfonated aromatic hydrocarbon-based resin membrane, or the like may be used.

The polymer electrolyte fuel cell using the electrode substrate of the present invention is a fuel cell of long life, because it uses the electrode substrate of the present invention, and therefore, the polymer electrolyte membrane is not directly damaged, and swelling and shrinkage of the polymer electrolyte membrane can be inhibited.

This fuel cell is completely the same as a conventional fuel cell, except that it contains the electrode substrate of the present invention. For example, the fuel cell has a multi-layered structure of cell units, in which the above-mentioned membrane-electrode assembly is sandwiched between a pair of bipolar plates. The fuel cell can be produced, for example, by stacking a plurality of cell units, and immobilizing them.

The bipolar plate is not particularly limited, so long as it exhibits a high conductivity and a gas impermeability, and has a flow path capable of supplying a gas to the gas diffusion electrodes. As the bipolar plate, for example, a carbon molding material, a carbon-resin composite material, a metal material, and the like may be used.

EXAMPLES

The present invention now will be further illustrated by, but is by no means limited to, the following Examples.

Examples

<Preparation of First Spinning Solution>

A vinylidene fluoride-tetrafluoroethylene-hexafluoropropylene copolymer was added to N,N-dimethylformamide (DMF), and dissolved therein using a rocking mill to obtain a solution having a concentration of 10 mass %.

Next, carbon black (DENKA BLACK granule products, manufactured by Denki Kagaku Kogyo K. K., average primary particle diameter: 35 nm) as conductive particles, and a phenolic resin (BELLPEARL, Air Water Bellpearl Inc.) as a thermosetting resin were added to the solution. After being stirred, the mixture was diluted by adding DMF thereto, and the carbon black and the phenolic resin were dispersed, to prepare a first spinning solution having a solid mass ratio of 40:10:50 (carbon black:phenolic resin:vinylidene fluoride-tetrafluoroethylene-hexafluoropropylene copolymer) and a solid content concentration of 10 mass %.

<Preparation of Second Spinning Solution>

A second spinning solution having a solid content concentration of 10 mass % was prepared in a similar manner to the procedure of preparing the first spinning solution, except that the solid mass ratio was 40:20:40 (carbon black:phenolic resin:vinylidene fluoride-tetrafluoroethylene-hexafluoropropylene copolymer).

<Preparation of Third Spinning Solution>

A third spinning solution having a solid content concentration of 10 mass % was prepared in a similar manner to the procedure of preparing the first spinning solution, except that the solid mass ratio was 40:30:30 (carbon black:phenolic resin:vinylidene fluoride-tetrafluoroethylene-hexafluoropropylene copolymer).

<Preparation of Fourth Spinning Solution>

A fourth spinning solution having a solid content concentration of 10 mass % was prepared in a similar manner to the procedure of preparing the first spinning solution, except that the solid mass ratio was 50:10:40 (carbon black:phenolic resin:vinylidene fluoride-tetrafluoroethylene-hexafluoropropylene copolymer).

<Preparation of Fifth Spinning Solution>

A fifth spinning solution having a solid content concentration of 10 mass % was prepared in a similar manner to the procedure of preparing the first spinning solution, except that the solid mass ratio was 50:20:30 (carbon black:phenolic resin:vinylidene fluoride-tetrafluoroethylene-hexafluoropropylene copolymer).

<Preparation of Sixth Spinning Solution>

A sixth spinning solution having a solid content concentration of 10 mass % was prepared in a similar manner to the procedure of preparing the first spinning solution, except that the solid mass ratio was 60:10:30 (carbon black:phenolic resin:vinylidene fluoride-tetrafluoroethylene-hexafluoropropylene copolymer).

<Preparation of Seventh Spinning Solution>

A seventh spinning solution having a solid mass ratio of 40:60 (carbon black:vinylidene fluoride-tetrafluoroethylene-hexafluoropropylene copolymer) and a solid content concentration of 10 mass % was prepared in a similar manner to the procedure of preparing the first spinning solution, except that the phenolic resin was not added.

<Preparation of Eighth Spinning Solution>

An eighth spinning solution having a solid mass ratio of 60:40 (carbon black:vinylidene fluoride-tetrafluoroethylene-hexafluoropropylene copolymer) and a solid content concentration of 10 mass % was prepared in a similar manner to the procedure of preparing the seventh spinning solution, except that the ratio of the carbon black and the vinylidene fluoride-tetrafluoroethylene-hexafluoropropylene copolymer was changed.

<Preparation of Ninth Spinning Solution>

A ninth spinning solution was prepared in a similar manner to the procedure of preparing the third spinning solution, except that an epoxy resin, wherein a cresol novolac epoxy resin was the main agent and a novolac-type phenolic resin was the curing agent, was used instead of the phenolic resin, and the solid content concentration was changed to 16 mass %.

<Preparation of Tenth Spinning Solution>

A tenth spinning solution was prepared in a similar manner to the procedure of preparing the ninth spinning solution, except that vapor grown carbon fibers (VGCF, registered trademark, manufactured by Showa Denko K. K.) were used instead of the carbon black.

The mixing ratio of the first to eighth spinning solutions is shown in Table 1. In the Table, CB represents the carbon black, P represents the phenolic resin, and PV.TF.HFP represents the vinylidene fluoride-tetrafluoroethylene-hexafluoropropylene copolymer.

TABLE 1

| Spinning Solution | CB (mass %) | P (mass %) | PV•TF•HFP (mass %) |
|---|---|---|---|
| First spinning solution | 40 | 10 | 50 |
| Second spinning solution | 40 | 20 | 40 |
| Third spinning solution | 40 | 30 | 30 |
| Fourth spinning solution | 50 | 10 | 40 |
| Fifth spinning solution | 50 | 20 | 30 |
| Sixth spinning solution | 60 | 10 | 30 |
| Seventh spinning solution | 40 | — | 60 |
| Eighth spinning solution | 60 | — | 40 |

The mixing ratio of the ninth to tenth spinning solutions is shown in Table 2. In the Table, CB represents the carbon black, CF represents the vapor grown carbon fibers, and PV.TF.HFP represents the vinylidene fluoride-tetrafluoroethylene-hexafluoropropylene copolymer.

TABLE 2

| spinning Solution | Conductive particles (mass %) | Epoxy resin (mass %) | PV•TF•HFP (mass %) |
|---|---|---|---|
| Ninth spinning Solution | 40 (CB) | 30 | 30 |
| Tenth spinning Solution | 40 (CF) | 30 | 30 |

Example 1

Conductive fibers obtained by spinning the first spinning solution by electrospinning were directly collected on a stainless steel drum as a counter electrode to prepare a fiber web consisting of only continuous conductive fibers. The fiber web was heat-treated at a temperature of 140° C. for 1 hour to cure the phenolic resin, and to prepare an electrode substrate (mass per unit area: 36 g/m$^2$, thickness: 160 μm, porosity: 87%, average fiber diameter: 830 nm, electrical resistance: 33 mΩ·cm$^2$). Some of the carbon black, which constituted the conductive fibers, was present inside the conductive fibers, and some of the carbon black was exposed from the surface of the fibers, and the fibers were bound to one another at the time of collection. The electrospinning was carried out under the following conditions.

Electrodes: a metal nozzle (inner diameter: 0.33 mm) and a stainless steel drum
Discharge rate: 2 g/hr
Distance between the nozzle tip and the stainless steel drum: 10 cm
Applied voltage: 15 kV
Temperature/humidity: 25° C./30% RH

Example 2

The procedure of Example 1 was repeated, except that the second spinning solution was used, to prepare an electrode substrate (mass per unit area: 34 g/m$^2$, thickness: 180 μm, porosity: 89%, average fiber diameter: 360 nm, electrical resistance: 39 mΩ·cm$^2$). Some of the carbon black, which constituted the conductive fibers, was present inside the conductive fibers, and some of the carbon black was exposed from the surface of the fibers, and the fibers were bound to one another at the time of collection.

Example 3

The procedure of Example 1 was repeated, except that the third spinning solution was used, to prepare an electrode substrate (mass per unit area: 37 g/m$^2$, thickness: 200 μm, porosity: 89%, average fiber diameter: 270 nm, electrical resistance: 44 mΩ·cm$^2$). Some of the carbon black, which constituted the conductive fibers, was present inside the conductive fibers, and some of the carbon black was exposed from the surface of the fibers, and the fibers were bound to one another at the time of collection.

Example 4

The procedure of Example 1 was repeated, except that the fourth spinning solution was used, to prepare an electrode substrate (mass per unit area: 18 g/m$^2$, thickness: 100 μm, porosity: 90%, average fiber diameter: 550 nm, electrical resistance: 26 mΩ·cm$^2$). Some of the carbon black, which constituted the conductive fibers, was present inside the conductive fibers, and some of the carbon black was exposed from the surface of the fibers, and the fibers were bound to one another at the time of collection.

Example 5

The procedure of Example 1 was repeated, except that the fifth spinning solution was used, to prepare an electrode substrate (mass per unit area: 17 g/m$^2$, thickness: 77 μm, porosity: 87%, average fiber diameter: 320 nm, electrical resistance: 30 mΩ·cm$^2$). Some of the carbon black, which constituted the conductive fibers, was present inside the conductive fibers, and some of the carbon black was exposed from the surface of the fibers, and the fibers were bound to one another at the time of collection.

Example 6

The procedure of Example 1 was repeated, except that the sixth spinning solution was used, to prepare an electrode substrate (mass per unit area: 20 g/m$^2$, thickness: 100 μm, porosity: 88%, average fiber diameter: 720 nm, electrical resistance: 21 mΩ·cm$^2$). Some of the carbon black, which constituted the conductive fibers, was present inside the conductive fibers, and some of the carbon black was exposed from the surface of the fibers, and the fibers were bound to one another at the time of collection.

Example 7

The procedure of Example 1 was repeated, except that the ninth spinning solution was used, to prepare an electrode substrate (mass per unit area: 90 g/m$^2$, thickness: 185 μm, porosity: 70%, average fiber diameter: 620 nm, electrical resistance: 45 mΩ·cm$^2$). Some of the carbon black, which constituted the conductive fibers, was present inside the conductive fibers, and some of the carbon black was exposed from the surface of the fibers, and the fibers were bound to one another at the time of collection.

Example 8

The procedure of Example 1 was repeated, except that the tenth spinning solution was used, to prepare an electrode substrate (mass per unit area: 42 g/m$^2$, thickness: 150 μm, porosity: 82%, average fiber diameter: 720 nm, electrical resistance: 40 mΩ cm$^2$). Some of the vapor grown carbon fibers, which constituted the conductive fibers, were present inside the conductive fibers, and some of the vapor grown carbon fibers were exposed from the surface of the fibers, and the fibers were bound to one another at the time of collection.

Comparative Example 1

The procedure of Example 1 was repeated, except that the heat treatment was not carried out, to prepare an electrode substrate (mass per unit area: 22 g/m$^2$, thickness: 100 μm, porosity: 88%, average fiber diameter: 700 nm, electrical resistance: 35 mΩ cm$^2$). Some of the carbon black, which constituted the conductive fibers, was present inside the conductive fibers, and some of the carbon black was exposed from the surface of the fibers, and the fibers were bound to one another at the time of collection.

Comparative Example 2

The procedure of Comparative Example 1 was repeated, except that the seventh spinning solution, to prepare an electrode substrate (mass per unit area: 18 g/m$^2$, thickness: 90 μm, porosity: 90%, average fiber diameter: 900 nm, electrical resistance: 43 mΩ cm$^2$). Some of the carbon black, which constituted the conductive fibers, was present inside the conductive fibers, and some of the carbon black was exposed from the surface of the fibers, and the fibers were bound to one another at the time of collection.

Comparative Example 3

The procedure of Comparative Example 2 was repeated to prepare an electrode substrate (mass per unit area: 65 g/m$^2$, thickness: 180 μm, porosity: 80%, average fiber diameter: 680 nm, electrical resistance: 39 mΩ·cm²). Some of the carbon black, which constituted the conductive fibers, was present inside the conductive fibers, and some of the carbon black was exposed from the surface of the fibers, and the fibers were bound to one another at the time of collection.

Comparative Example 4

The procedure of Comparative Example 2 was repeated, except that the eighth spinning solution, to prepare an electrode substrate (mass per unit area: 21 g/m², thickness: 120 μm, porosity: 87%, average fiber diameter: 880 nm, electrical resistance: 25 mΩ·cm²). Some of the carbon black, which constituted the conductive fibers, was present inside the conductive fibers, and some of the carbon black was exposed from the surface of the fibers, and the fibers were bound to one another at the time of collection.

<Evaluation of Physical Properties>

With respect to the electrode substrates prepared in Examples 1 to 8 and Comparative Examples 1 to 4, a rupture strength, a specific rupture strength, an apparent Young's modulus, and a specific apparent Young's modulus were measured in accordance with the method as described above. The results are shown in Table 3. In the Table, M represents the mass per unit area (unit: g/m²), T represents the thickness (unit: μm), AD represents the apparent density (unit: g/cm³), RS represents the rupture strength (unit: MPa), SRS represents the specific rupture strength (unit: MPa/(g/cm³)), AY represents the apparent Young's modulus (unit: MPa), and SAY represents the specific apparent Young's modulus (unit: MPa/(g/cm³)).

TABLE 3

|  | M | T | AD | RS | SRS | AY | SAY |
|---|---|---|---|---|---|---|---|
| Example 1 | 36 | 160 | 0.23 | 1.3 | 5.7 | 13 | 59 |
| Example 2 | 34 | 180 | 0.19 | 1.5 | 7.9 | 10 | 51 |
| Example 3 | 37 | 200 | 0.19 | 0.8 | 4.2 | 14 | 79 |
| Example 4 | 18 | 100 | 0.18 | 1.4 | 7.8 | 8 | 43 |
| Example 5 | 17 | 77 | 0.22 | 1.3 | 5.9 | 20 | 91 |
| Example 6 | 20 | 100 | 0.20 | 1.0 | 5.0 | 8 | 40 |
| Example 7 | 90 | 185 | 0.49 | 3.9 | 8.0 | 183 | 377 |
| Example 8 | 42 | 150 | 0.28 | 3.0 | 10 | 161 | 575 |
| Comp. Example 1 | 22 | 100 | 0.22 | 1.2 | 5.5 | 8 | 34 |
| Comp. Example 2 | 18 | 90 | 0.20 | 0.9 | 4.5 | 5 | 27 |
| Comp. Example 3 | 65 | 180 | 0.36 | 1.0 | 2.8 | 12 | 33 |
| Comp. Example 4 | 21 | 120 | 0.18 | 0.1 | 0.7 | 1 | 7 |

As shown in Table 3, the electrode substrates of Examples 1 to 8 of the present invention exhibited a higher specific apparent Young's modulus, in comparison with the conventional electrode substrates of Comparative Examples 2 to 4, which were composed of a nonwoven fabric containing conductive fibers containing an organic resin and conductive particles, and exhibited a good rigidity, and therefore, it was revealed that the effect of inhibiting swelling and shrinkage of a polymer electrolyte membrane could be expected.

Further, it was found, from the comparison of electrode substrates of Examples 4 to 6 with that of Comparative Example 4, that even when the content of conductive particles (the content of carbon black) was 50 mass % or more, which was a large amount, the electrode substances of the present invention could exhibit a high specific apparent Young's modulus, and therefore, both a good conductivity, and the effect of inhibiting swelling and shrinkage of a polymer electrolyte membrane could be achieved.

INDUSTRIAL APPLICABILITY

The base material for a gas diffusion electrode of the present invention exhibited a good rigidity, in comparison with a conventional base material for a gas diffusion electrode, which is composed of a nonwoven fabric containing conductive fibers containing an organic resin and conductive particles, and therefore, swelling and shrinkage of a polymer electrolyte membrane can be inhibited. Further, the base material for a gas diffusion electrode of the present invention is flexible, in comparison with a conventional base material for a gas diffusion electrode, which is made of a carbon paper or glass fibers, and therefore, the polymer electrolyte membrane is not directly damaged. Therefore, it may be suitably used in polymer electrolyte fuel cell applications.

Although the present invention has been described with reference to specific embodiments, various changes and modifications obvious to those skilled in the art are possible without departing from the scope of the appended claims.

REFERENCE SIGNS LIST 11a (Fuel electrode side) Bipolar plate
11c (Air electrode side) Bipolar plate
13a (Fuel electrode side) Gas diffusion layer
13c (Air electrode side) Gas diffusion layer
14a (Fuel electrode side) Water control layer
14c (Air electrode side) Water control layer
15a (Fuel electrode side) Catalyst layer
15c (Air electrode side) Catalyst layer
17a Fuel electrode (Gas diffusion electrode)
17c Air electrode (Gas diffusion electrode)
19 Polymer electrolyte membrane

The invention claimed is:

1. A base material for a gas diffusion electrode, comprising a nonwoven fabric containing conductive fibers that contain conductive particles at least in the inside of an organic resin, wherein the conductive fibers contain a thermosetting resin, and a specific apparent Young's modulus of the base material for a gas diffusion electrode is 40 [MPa/(g/cm³)] or more.

* * * * *